United States Patent [19]

Raybould et al.

[11] Patent Number: 4,782,994
[45] Date of Patent: Nov. 8, 1988

[54] METHOD AND APPARATUS FOR CONTINUOUS IN-LINE ANNEALING OF AMORPHOUS STRIP

[75] Inventors: Derek Raybould; Dulari L. Sawhney, both of Denville; Anthony J. Esposito, Lake Hiawatha, all of N.J.

[73] Assignee: Electric Power Research Institute, Inc., Palo Alto, Calif.

[21] Appl. No.: 77,509

[22] Filed: Jul. 24, 1987

[51] Int. Cl.⁴ .................. B23K 20/04; H01F 1/02
[52] U.S. Cl. .................... 228/235; 228/190; 228/199; 228/44.3; 228/30; 164/463; 164/477; 148/403; 148/103; 72/700
[58] Field of Search ............. 228/235, 265, 102, 190, 228/199, 200, 7, 18, 30, 44.3; 164/477, 463, 423, 276; 148/2, 3, 11.5 R, 403, 103; 72/700

[56] References Cited

U.S. PATENT DOCUMENTS

| | | | |
|---|---|---|---|
| 4,053,331 | 10/1977 | Graham, Jr. et al. | 148/403 |
| 4,081,298 | 3/1978 | Mendelsohn et al. | 148/403 |
| 4,219,355 | 8/1980 | DeCristofaro et al. | 148/103 |
| 4,379,004 | 4/1983 | Makino et al. | 148/103 |
| 4,413,406 | 11/1983 | Bennett et al. | 228/190 |
| 4,423,120 | 12/1983 | Paulus et al. | 228/203 |
| 4,444,602 | 4/1984 | Makino et al. | 148/403 |
| 4,525,222 | 6/1985 | Meguro et al. | 148/121 |
| 4,529,457 | 7/1985 | Kushnick | 148/403 |
| 4,529,458 | 7/1985 | Kushnick et al. | 148/403 |
| 4,596,613 | 6/1986 | Lin et al. | 148/20.3 |

FOREIGN PATENT DOCUMENTS

| | | | |
|---|---|---|---|
| 3247286 | 6/1983 | Fed. Rep. of Germany | 148/103 |
| 3406807 | 10/1984 | Fed. Rep. of Germany | 148/103 |
| 8329 | 1/1978 | Japan | 164/477 |
| 41223 | 4/1979 | Japan | 148/403 |
| 5441123 | 4/1979 | Japan | 148/131 |
| 5570491 | 5/1980 | Japan | 228/190 |
| 97019 | 7/1980 | Japan | 148/103 |
| 130449 | 10/1981 | Japan | 148/403 |
| 54222 | 3/1982 | Japan | 148/403 |
| 39509 | 3/1982 | Japan | 148/403 |
| 97606 | 6/1982 | Japan | 148/3 |
| 103985 | 6/1983 | Japan | 228/190 |
| 153749 | 9/1983 | Japan | 148/403 |
| 76856 | 5/1984 | Japan | 164/477 |
| 99456 | 6/1985 | Japan | 164/477 |

Primary Examiner—Nicholas P. Godici
Assistant Examiner—Samuel M. Heinrich
Attorney, Agent, or Firm—King and Schickli

[57] ABSTRACT

An apparatus for the in-line annealing of amorphous strip includes feed rolls for substantially continuously feeding the strip during annealing. The strip is first fed into a nip of cooperating heated pressure rolls. The heated pressure rolls rapidly heat the strip to an annealing temperature at a rate of substantially $10^2$–$10^4$ °C./second while also subjecting the strip to localized plastic deformation. Where multiple ribbons are being fed simultaneously through the heating pressure rolls, bonding occurs to produce a composite strip. The strip is fed from the pressure rolls through an in-line annealer immediately downstream from the pressure rolls. During annealing, the strip is continuously fed and maintained under tension by operation of a winding roll. The strip is annealed at a temperature of between 420°–510° C. for 0.01–10.0 minutes. Torque of between 200–600 inch pounds is applied to the strip both during annealing and as the strip cools to room temperature prior to winding. An associated method is also disclosed.

28 Claims, 1 Drawing Sheet

METHOD AND APPARATUS FOR CONTINUOUS IN-LINE ANNEALING OF AMORPHOUS STRIP

TECHNICAL FIELD

The present invention relates generally to a method and apparatus for continuous in-line annealing of amorphous ribbon and, more particularly, to the fabrication and continuous in-line annealing of composite amorphous strip.

BACKGROUND OF THE INVENTION

A cast product having an amorphous or glassy atomic structure, in the form of a relatively thin elongated ribbon, has proven to be effective for winding into highly efficient cores for electrical transformers or other uses. Some of the most recent developments in the casting of amorphous or glassy metal ribbons are reviewed in U.S. Pat. No. 4,332,848.

As is known, the casting of ribbons having an amorphous or glassy structure requires the application of a particularly high chill rate to the ribbon on the order of $10^5$–$10^{6°}$ C./second Further, this chill rate must be provided throughout the entire thickness of the ribbon if a continuous glassy structure is to be obtained. Consequently, the thickness of amorphous cast ribbons is limited by these extreme heat transfer requirements. If proper heat transfer is not maintained some crystalization occurs, thus destroying the amorphous structure.

The thinness and flexibility of the cast ribbons makes handling of ribbons difficult. Further, when these thin ribbons are stacked in a transformer core, the thinness of the ribbons causes some difficulty with stacking efficiency which in turn causes an apparent density that leaves room for improvement.

Increased stacking or packing densities are possible with thicker ribbons. Advantageously, along with the increased packing density of thicker ribbons there is a characteristic significant increase in the efficiency of the transformer and generally a lower cost. These advantages are deemed to make it worthwhile to seek a way to successfully make thicker amorphous metal ribbons or strips.

U.S. Pat. No. 4,529,458 to Kushnik, et al., assigned to Allied-Signal Corporation, discloses one particularly successful method for making relatively thick composite amorphous strip by compacting relatively thin cast amorphous ribbons. Following compaction, the composite or consolidated strip is subjected to annealing to remove stresses generated during formation and provide improved magnetic properties. As disclosed in the U.S. Pat. No. 4,529,458 patent, a conventional two-stage batch anneal is utilized. In this two-step approach the strip is first annealed at high temperature to relieve stress and then subjected to a standard field anneal.

While this method of annealing is effective in improving the overall magnetic properties of the composite strip, it is not without its disadvantages. First, with this technique the resulting magnetic properties of the composite strip approach, but do not equal, the magnetic properties of an annealed, unconsolidated ribbon. Secondly, this annealing technique is time consuming, relatively expensive and inefficient.

Thus, a need is identified for a new method of annealing composite strip producing improved results. The new method should also be faster, and relatively less expensive by eliminating the need for high temperature furnaces. A method providing distinct advantages when annealing either unconsolidated, as-cast ribbon or composite strip would be very desirable.

SUMMARY OF THE INVENTION

Accordingly, a primary object of the present invention is to provide a method and apparatus for more efficiently and economically improving the magnetic properties of amorphous material.

Another object of the present invention is to provide a method and apparatus for producing relatively thick composite strip with substantially the same magnitude of good magnetic properties as relatively thin, unconsolidated ribbon after annealing.

A further object of the present invention is to provide a method and apparatus for processing either as-cast ribbon or composite amorphous strip with improved magnetic properties and a consistently higher packing factor for use in the production of transformer cores and other devices of improved overall efficiency.

Still another object of the present invention is the provision of an economical method and an apparatus for the continuous in-line annealing of either relatively thin as-cast ribbon or relatively thick composite strip that avoids embrittlement so as to provide a relatively ductile product that is easier to handle and able to be shipped to a customer already annealed and with superior magnetic properties.

To achieve the foregoing and other objects and in accordance with the purposes of the present invention as described herein, an improved apparatus is provided for the continuous in-line annealing of amorphous strip. The apparatus includes means, such as feed rolls, for substantially continuously feeding the strip at a controlled rate of movement. Heated pressure rolls are also provided. The strip is passed through a nip formed by the heated pressure rolls and rapidly heated to an annealing temperature at a rate of substantially $10^2$–$10^{4°}$ C./second.

The heated pressure rolls are maintained at a temperature and pressure sufficient to bring the strip to a temperature between the curie temperature and the glass transformation temperature characteristic of the strip material. Thus, the pressure rolls also produce a localized plastic deformation of the strip.

A separate stress annealer is provided in-line just downstream from the heated pressure rolls. As discussed below, the annealer may be in the form of a pair of hot plates between which the strip is fed. It should be appreciated, however, that other, alternative devices for annealing may be utilized and the invention is in no way limited to this particular embodiment.

The strip enters the annealer at or near the temperature of the heated pressure rolls. The strip then rapidly attains an equilibrium temperature with the annealer usually maintained at a temperature above the heated pressure roll temperature. For Metglas ® 2605-S2 glassy alloy available from Allied-Signal Corporation, the strip temperature in the annealer may range anywhere from 420° to 510 ° C. Temperatures significantly below this range fail to provide the desired stress relief while temperatures significantly above this range promote crystallization. Further, it should be recognized that the temperature of the annealer preferably should be regulated within a range of plus or minus 5° C. during annealing of the length of the strip so as to assure consistent magnetic properties throughout the strip.

Throughout the annealing process, the strip is maintained in tension as it is continuously fed by the driven feed rolls. The compressive forces of the heated pressure rolls complement this tension to produce strip with very high quality magnetic and mechanical properties. Preferably, the tension is maintained on the strip by means of a driven winding roll. This winding roll is spaced sufficiently from the annealer so as to allow the strip to cool prior to winding. The strip tension during annealing should be carefully optimized, as too low or high a tension can lead to deteriorated magnetic properties.

As a general rule, the in-line annealing described above improves the magnetic properties of the strip so that subsequent field annealing is not required and in fact, in many cases is detrimental. Still, there may be certain applications for which a subsequent field anneal would be desired.

In such a situation, a magnetic field annealing station is situated in-line immediately downstream from the stress annealer and upstream from the winding roll. The magnetic field annealing station may be formed by a quartz tube through which the strip is passed. A copper wire is wrapped around the quartz tube. When energized this copper wire develops a magnetic field in the tube.

Preferably, the tube is situated so that the strip cools through its curie temperature in the magnetic field which is adjusted to substantially the 10 Oe level. Where the in-line magnetic field annealing station is utilized, lower rolling speeds and higher in-line stress annealer temperatures produce the best results.

In accordance with yet another aspect of the present invention multiple driven feed rolls are provided for feeding individual ribbons or strips of amorphous material into the nip of the heated pressure rolls. The pressure rolls are operated at a temperature and pressure sufficient to cause bonding between the multiple ribbons and production of a relatively thick composite strip. For example, Metglas ® 2605-S2 alloy ribbon is subjected to a rolling pressure of at least 25,000 psi and brought to a temperature of approximately 475° C. by the heated pressure rolls. This produces the necessary localized plastic deformation of the individual ribbons to promote bonding into composite strip. Of course, it should be appreciated that too low a pressure does not deform the ribbon sufficiently for bonding. Too high a pressure in some cases results in the pressure rolls themselves deforming possibly resulting in the need to shut down and repair the rolling mill. Thus, this parameter must be controlled and monitored.

Whether processing a single as-cast ribbon or a composite strip, rolling serves to flatten the faces of the resulting strip. Consequently, the strip exhibits an improved packing factor allowing the manufacture of transformer cores with exceedingly high efficiency.

By being positioned just downstream from the pressure rolls, the separate annealer allows the advantageous use of the heat already in the strip from the bonding process to quickly bring the strip to temperature. Further, it should be appreciated that this annealing is a continuous process taking place in-line. A feed rate of from four to six feet per minute is possible where, for example, the strip is to also be processed through a magnetic field annealing station as described above. Faster feed rates may, however, be easily achieved by either increasing the temperature or diameter of the heated pressure rolls.

Still higher feeding rates may be provided by preheating the strip to a temperature between 150°-375° C. prior to feeding between the pressurized feed rolls. Preferably, the strip is heated to a temperature between 200° and 300° C. prior to passing into the pressurized feed roll nip. In this manner feeding rates of up to 80 or 100 feet per minute may be obtained thus dramatically increasing the production rate and reducing the per unit cost associated with processing ribbon or strip via the in-line annealing method of the present invention. Any means of preheating the strip may, of course, be used including heated feed rolls and/or an in-line heater provided just upstream from the pressure rolls. This heater may be in the form of two plates through which the strip is passed as described above with respect to the in-line annealer or an argon preheater.

During the annealing of composite strip, the strip is maintained under tension just as when processing relatively thin as-cast ribbon. For example, for one-inch wide by five layer strip (again, Metglas ® 2605-S2 alloy), the torque produced by the winder should be approximately 240 inch pounds. For two-inch wide by three layer strip approximately 600 inch pounds of torque is required for optimal results. Reasonable results have also been obtained for four-inch wide by five layer strip at this 600 inch pound level.

Throughout the in-line annealing process, the parameters of strip feeding rate, temperature and pressure of the heated pressure rolls, temperature of the separate in-line annealer, and the tension on the strip (as well as the field strength of the magnetic annealing station when utilized) are critically important to efficient and effective bonding and annealing. In order to maintain each of these parameters in proper relation during operation so as to provide optimal results, a computerized control means is provided. Preferably, this control means is in the form of a microprocessor programmed with information relative to the characteristics of the strip material being bonded.

In accordance with yet another aspect of the present invention, a method is provided for the continuous in-line annealing of amorphous strip. The method includes the step of feeding the strip at a controlled rate of movement between 0.1 to 100 feet/minute. Next is the step of rapidly bringing the strip to an annealing temperature while plastically deforming the strip to improve its surface properties. Following this, the strip is subjected to annealing for a relatively short period of time from 0.01 to 10.0 minutes at the annealing temperature. During the annealing process, provision is made for tensioning the strip during the continuous feeding.

As discussed above, it is possible to further increase the speed of this in-line annealing process by preheating the strip prior to bringing the strip to the annealing temperature. Preferably, the strip is preheated to substantially 200°-300° C. for best results. With the application of this preheating process the strip may be in-line annealed at a feed rate of substantially 80 to 100 feet per minute.

Where it is desired to produce a relatively thick end product of composite strip, multiple ribbons may be simultaneously fed in alignment into cooperating heated pressure rolls. As described above, these rolls are maintained at a temperature and pressure effective in bonding the ribbons together and rapidly heating the resulting composite strip to an annealing temperature. More specifically, the heated pressure rolls serve to heat the strip to a temperature substantially 95 percent of the crystalization temperature of the strip material as the strip is subjected to a pressure of at least 25,000 psi.

Additional steps of the method relate to the regulating of the temperature of the hot plate annealer preferably within a range of plus or minus 5° C. during in-line annealing of the strip. In this way, the process produces consistent magnetic properties throughout the length of the strip. As a further consideration, where magnetic field annealing is desired as, for example, to remove some directionality of the magnetic properties of the strip, the method includes the additional step of continuous in-line magnetic annealing of the strip as it cools through its curie temperature.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

Figure 1:
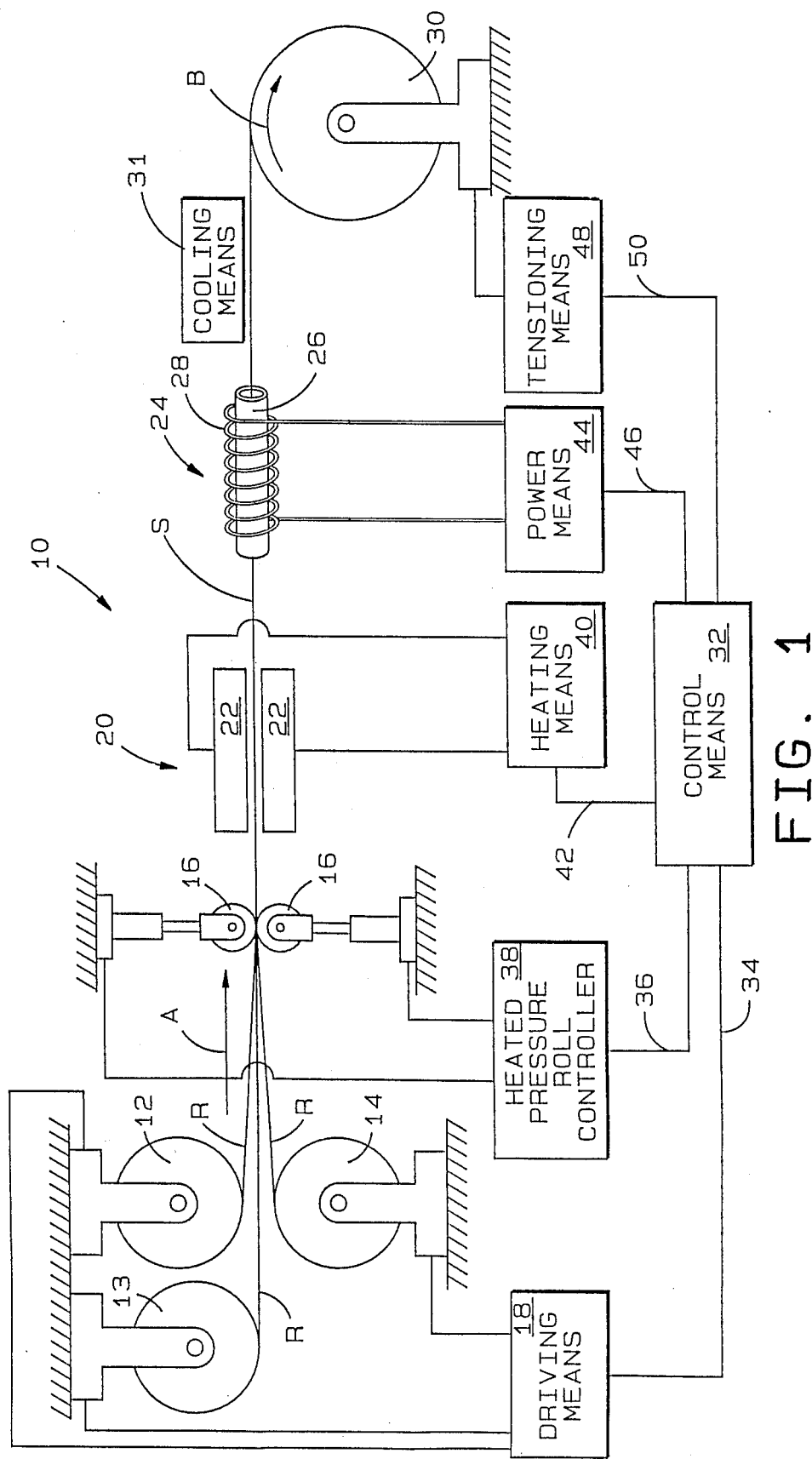
FIG. 1 is a schematical representation showing and fully demonstrating the apparatus and method of the present invention for the in-line annealing of both as-cast and composite amorphous strip.

Reference will now be made in detail to the present preferred embodiment of the invention, an example of which is illustrated in the accompanying drawing.

DETAILED DESCRIPTION OF THE INVENTION

Reference is now made to the drawing figure schematically showing an apparatus 10 for the in-line bonding and annealing of composite strip S. The apparatus 10 advantageously provides the strip S with improved magnetic properties, a higher packing factor and greater ductility for easier handling when, for example, winding into transformer cores of improved efficiency.

As shown, the apparatus 10 includes multiple feed rolls 12, 13 and 14 for feeding individual ribbons R in the direction of action arrow A into the nip of cooperating heated pressure rolls 16. The feed rolls 12–14 are all driven at the same speed by a drive means 18 and aligned so as to position the ribbons R in overlapping relationship for bonding by the heated pressure rolls 16.

Where the ribbons R are fed into the pressure rolls 16 at room temperature, the ribbon feed rate is substantially 4–6 feet per minute. Alternatively, much higher feed rates are possible where the ribbons R are preheated to a temperature between 150° to 375° C. prior to feeding into the heated pressure rolls 16. The best results appear to be obtained by preheating the ribbons R to a temperature of between 200° to 300° C. When this is done, ribbon movement or feed rates of approximately 80 to 100 feet per minute are possible while still obtaining excellent bonding into composite strip S. This preheating may be achieved by any means known in the art. For example, the feed rolls themselves may be heated or the ribbons may be heated somewhere between the feed rolls 12–14 and the pressure rolls 16. This latter approach may be achieved by heating the ribbons with either a hot plate or an argon preheater.

As the aligned ribbons R are fed into the nip and passed between the heated pressure rolls 16, the ribbons are bonded together into a single composite strip S. In order to achieve the rapid heating of the ribbons R necessary for proper bonding, a temperature and pressure applied by the rolls 16 must be sufficient to bring the ribbons R to a temperature between the curie temperature and glass transformation temperature characteristic of the ribbon material. More specifically, the roll 16 must be brought to a relatively high temperature (400°–500° C) while subjecting the ribbons R to a high pressure of at least 25,000 psi to assure localized plastic deformation for proper bonding. Advantageously, there high pressures not only assure bonding but remove surface irregularities from the composite strip S thereby providing a smooth surface and an increase in packing factor.

Under these extreme operating conditions, it should be appreciated that heated pressure roll construction is of particular concern. For example, where the ribbons R are to be fed into the roll 16 at room temperature, the rolls must be constructed from a material having a hardness at 400°–500° C. comparable to that of the amorphous alloy being bonded when at room temperature. Examples of materials having the desired properties for roll construction include cemented tungsten carbide alloys or NiMoB materials. Less expensive rolls constructed of T15 tool steel also provide acceptable wear while producing strip with good surface finish.

Immediately downstream from the heated pressure rolls 16 is the annealer 20. As shown, the annealer 20 comprises two hot plates 22, one above and one below the strip S. The strip S enters the annealer 20 at or near the temperature of the heated pressure rolls 16 which not only bond the strip but also rapidly heat the strip near an annealing temperature at a rate of $10^2$–$10^4$ C./second. The strip S then rapidly attains an equilibrium annealing temperature as it passes between the hot plates 22 that are usually maintained at a temperature above the heated pressure roll temperature.

Total annealing time for the strip is less than ten minutes and usually less than one-half minute. During this time, magnetic properties of the strip, such as core loss and exciting power, are improved so as to be substantially of the same magnitude as available from as-cast ribbon following complete annealing with prior art methods. Advantageously, however, with the present method relative ductility of the strip is maintained. By avoiding the embrittlement of the strip as occurs in the more time consuming and less efficient prior art batch annealing methods, the strip is much easier to handle and use in manufacturing transformer cores and the like. The strip may also be wound to a tighter radius without delaminating or breaking.

During annealing, the strip is brought to an equilibrium temperature of between approximately 420°–510° C. for 0.01 to 10 minutes. Too low a temperature fails to provide the desired stress relief. Conversely, too high a temperature crystallizes the strip. Thus, annealing temperatures substantially outside this range are to be avoided.

It should also be appreciated that the temperature of the annealer 20 is regulated in order to achieve consistent magnetic properties throughout the length of the strip S. Research has shown that variations in annealer temperature of more than plus or minus 5° C. during annealing of a single composite strip may cause inconsistent properties in the strip. Thus, where consistent properties are desired, such variations outside this range are to be avoided.

In those instances where subsequent field annealing is desired, the strip S is fed in-line from the stress annealer 20 through a field annealing station 24. As shown, the field annealing station 24 comprises a quartz tube 26 through which the composite strip S passes. The tube 26 is wrapped in a copper coil 28 that may be energized to produce a magnetic field within the tube.

The field annealing station 24 is positioned in line a sufficient distance from the annealer 20 so that the strip S is cooling through its curie temperature as it passes through the quartz tube 26. The field produced by the copper coil 28 is adjusted to a level of substantially 10 Oe at the center of the tube 26. For best results, lower ribbon feed and rolling rates and higher in-line annealing temperatures are utilized when field annealing.

As the strip S is annealed, it is continuously maintained under tension so as to optimize the improvements to the magnetic properties. As shown, a driven winding roll 30 is provided. Of course, a combination of tensioning rolls (not shown) could also be utilized. The winding roll 30 may be spaced a sufficient distance from the annealer 20 so as to allow the strip S to cool to or near room temperature prior to winding. Alternatively, a cooling means 31, such as compressed air jets, may be provided upstream from the winding roll 30 to cool the strip to ambient.

During winding, the winding roll 30 is rotated in the direction of action arrow B so as not only to wind the strip S but also place the strip under tension as it anneals and subsequently cools. Testing has shown that the magnetic properties of the strip S following annealing first improve with increasing tension and then, surprisingly, deteriorate as the tension is increased further. Thus, it is clear that the tension maintained on the strip S during annealing must be carefully optimized for best results. When determining the amount of tension to be applied to the strip S, the strip material (i.e. particular alloy) and geometry (overall width and number of layers) must be considered.

It should be appreciated from a review of the above, that the magnetic properties of the strip S may only be optimized by controlling various operation parameters of the in-line annealing process. The critical parameters include the strip feeding or moving rate, the temperature and pressure of the heated pressure rolls 16, the temperature of the annealer 20, the tension maintained on the strip during annealing and cooling, and, where desired, the magnetic field strength of the field annealing station when field annealing. Each of these parameters is adjusted relative to one another and to the particular characteristics of the amorphous alloy strip by control means 32. The control means 32 may take the form of a microprocessor specifically programmed to optimize the various operating conditions.

As shown, the control means 32 is connected to the driving means 18 via control line 34. Control signals issuing from the control means 32 and passing along this line 34 serve to regulate the speed of the driving means 18 and, therefore, the ribbon feed or movement rate. Similar control signals issuing from the control means 32 and travelling along the line 36 to the heated pressure roll controller 38 provide for the regulation of the temperature and pressure of the rolls 16 for optimum bonding and formation of composite strip.

The temperature of the annealer 20 is regulated and controlled as required through connection of the control means 32 to the heating means 40 of the annealer through the control line 42. The means 44 for powering the copper coil 28 and producing a magnetic field at the field annealing station 24 is connected to the control means 32 through the control line 46. Lastly, the tensioning means 48 of the winding roll 30 is regulated and adjusted in accordance with the other operating parameters to provide the optimum tension on the strip S for maximizing the magnetic properties of the strip through this in-line annealing process. Any adjustments required in the tension being maintained on the strip S are made by the control means by issuing a control signal along the control line 50.

The ribbon R is fed in a controlled manner at room temperature into heated pressure roll 16 having a diameter of approximately 6 inches; the rate of movement being substantially 4 to 6 feet per minute. Higher feed rates for more efficient and economical production of strip may, however, be achieved in any number of ways. For example, the temperature of the pressure rolls 16 may be increased so as to increase the rate of heat input into the strip S. In fact, the temperature may actually be increased above the crystallization temperature of the ribbon itself. The amorphous structure of the resulting composite strip is maintained so long as the feed rate is increased sufficiently to assure the ribbon will not have time to reach the higher roll temperature (thus avoiding crystallization) but will achieve the proper temperature for bonding.

The ribbon or strip movement or feed rate may also be increased by increasing the diameter of the heated pressure roll 16. In this way, the area of contact between the heated pressure roll 16 and the ribbon R is increased for faster heat transfer into the ribbon.

Another aspect of the method includes the additional step of preheating the ribbon R prior to the ribbon entering the nip between the pressure rolls 16. While initial work in this area established that preheating is detrimental and prevents bonding, it should be appreciated that only high temperature preheating was being studied at that time. We have now determined that low temperature preheating (from approximately 150°–375° C.) is an unexpectedly effective technique that may be utilized to dramatically increase the feed rate and still achieve proper bonding.

Generally, the maximum feed rate increased proportionally with ribbon preheat temperature until a preheat temperature is reached at which bonding no longer occurs at any feed rate. Preferably, the ribbon R is preheated to a temperature of substantially 200°–300° C. for best results. This allows the utilization of feed rates of up to 80 feet per minute or greater.

As the single ribbon R is fed into the nip of the heated pressure rolls 16, the ribbon is rapidly heated at a rate of substantially $10^2$–$10^4$ ° C./second to an annealing temperature. The ribbon is also subjected to sufficient pressure to improve the surface qualities of the ribbon as well as the overall packing factor. Where multiple ribbons R are being fed into the pressure rolls 16, the ribbons are subjected to heat and pressure sufficient to produce localized plastic deformation for bonding the ribbons into a composite strip S. In order to achieve this result, the ribbons R are heated to a temperature substantially 95 percent of the crystallization temperature and subjected to a pressure on the order of 25,000 psi. The resulting ribbons have a smooth surface and a packing factor consistently above 90%.

After passing through the pressure rolls 16, the strip S is immediately subjected to annealing for a relatively short period of time while also being maintained under tension. More specifically, the strip S is continuously fed between the hot plates 22 of the annealer 20. To assure consistent magnetic properties, the temperature of the hot plates 22 is regulated by operation of the heating means 40 so as to remain within a range of plus or minus 5° C. during annealing of the strip. More specifically, the strip is annealed at a temperature between 420° and 510° C. for a period of time of substantially 0.01 to 10.0 minutes during continuous feeding. This relieves the stress in the strip and provides the composite strip with a magnitude of good magnetic properties substantially corresponding to the properties of annealed unconsolidated ribbon. More specifically, core losses of 0.22 W/kg and exciting power of 0.35 VA/kg at 60 hertz and 1.4 tesla are routinely obtained. Such properties represent a marked improvement over those previously achievable with batch annealing techniques. Further, since the strip is maintained at annealing temperature for a relatively short period of time, the strip remains ductile and therefore more adapted for subsequent handling. In fact, the annealed strip exhibits mechanical properties comparable to as-cast ribbon rather than annealed ribbon and may even be cut and punched. This is not true of batch annealed strip which becomes embrittled. Therefore, the present invention clearly represents an advance in the art.

In order to assure a maximization of improved magnetic properties, the tension on the strip during annealing is carefully regulated. The tension is obtained through application of a torque of up to 600 inch pounds with the torque preferably falling within a range between 200 and 600 inch pounds.

While this in-line annealing procedure generally eliminates the need to perform field annealing, for certain ribbon applications field annealing may be desired to adjust the properties of the strip and tailor the strip to particular needs. In such an instance, the strip S is continuously fed from the annealer 20 to a field annealing station 24. There, the strip S cools through its curie temperature while being subjected to a magnetic field of substantially 10 Oe.

In summary, numerous benefits have been described which result from employing the concepts of the present invention. The continuous in-line annealing technique of the present invention provides a method for more efficiently and economically improving the magnetic properties of amorphous material. This is true whether the material is a single unconsolidated ribbon or a composite strip. By passing the ribbon or strip through the heated pressure rolls 16 at both high temperature and pressure the resulting product is furnished with improved surface properties. A packing factor is consistently obtained of over 90 percent. It should additionally be noted that due to the improved flatness there is a more uniform distribution of stress. As a consequence, strip produced by the method of the present invention advantageously exhibits a low stress sensitivity. Further, since the material is only subject to annealing temperatures for a relatively short period of time embrittlement is avoided. Each of these factors aid in the production of transformer cores of higher efficiency than could previously be produced from strip where the prior art technique of batch annealing had been utilized.

As a further advantage, strip produced by the method of the present invention does not require a thermal/magnetic anneal. This further reduces the cost and time involved in producing strip appropriate for stacked core applications.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and the variations are within the scope of the invention as determined by the appended claims when interpreted in accordance with the breadth to which they are fairly, legally and equitably entitled.

We claim:

1. An apparatus for the continuous annealing of amorphous strip, comprising:

means for substantially continuously feeding said strip at a controlled rate of movement;

means for rapidly heating said strip at a rate of substantially $10^2$–$10^{4°}$ C./second to an annealing temperature and producing a localized plastic deformation;

means for annealing said strip for a short period of time at said annealing temperature;

means for maintaining said strip in tension during said annealing as said strip is continuously fed from said feeding means; and means for cooling said strip prior to winding.

2. The apparatus recited in claim 1, wherein said feeding means further comprises a driven roll.

3. The apparatus recited in claim 2, wherein said roll is driven to feed said strip at a controlled rate of movement of between substantially 0.1 to 100 ft/min.

4. The apparatus recited in claim 1, wherein said rapidly heating means further comprises cooperating heated pressure rolls forming a nip for receiving said strip.

5. The apparatus recited in claim 4, wherein said heated pressure rolls are maintained at a temperature and pressure sufficient to bring said strip quickly to a temperature between a curie temperature and a glass transformation temperature characteristic of said strip.

6. The apparatus recited in claim 5, wherein said pressure is at least 25,000 psi.

7. The apparatus recited in claim 4, further comprising a magnetic annealing station positioned between said annealing means and said strip tension maintaining means so that said strip is magnetically annealed in tension as said strip cools through its curie temperature.

8. The apparatus recited in claim 1, further comprising control means for controlling operation parameters including strip feeding rate, temperature and pressure of said rapidly heating means, temperature of said annealing means, field strength of said magnetically annealing means, and tension of said strip tension maintaining means.

9. The apparatus recited in claim 1, wherein said annealing means includes a hot plate.

10. The apparatus recited in claim 8, wherein said annealing means includes a pair of hot plates between which said strip is passed.

11. The apparatus recited in claim 1, wherein said strip tension maintaining means further comprises a driven winding roll.

12. The apparatus recited in claim 11, wherein said driven winding roll maintains a tension on said strip during annealing by producing a torque of between substantially 200 to 600 inch lbs.

13. The apparatus recited in claim 11, wherein said means for cooling is said winding roll spaced sufficiently from said annealing means so as to allow said strip to cool to room temperature prior to winding.

14. The apparatus recited in claim 1, wherein said strip is maintained under tension at said annealing temperature for a period of time of substantially 0.01–10.0 minutes.

15. The apparatus recited in claim 1, wherein said strip is heated to a temperature between 420°–510° C. during annealing.

16. The apparatus recited in claim 1, wherein said feeding means further comprises multiple driven feed rolls for feeding multiple strips of amorphous material to said rapidly heating means operating at a temperature and pressure sufficient to promote bonding between said multiple strips and the production of a relatively thick strip.

17. The apparatus recited in claim 1, wherein said feeding means is heated so as to preheat said strip prior to processing and thereby allow a faster feed rate of movement.

18. The apparatus recited in claim 1 wherein said strip is preheated to substantially 150°–375° C.

19. A method for the continuous annealing of amorphous strip, comprising the steps of:
feeding the strip at a controlled rate of movement;
rapidly bringing the strip to an annealing temperature at a rate of substantially $10^2$–$10^4$ °C./second while plastically deforming said strip locally with compressive forces;
annealing the strip for a short period of time at said annealing temperature; and
tensioning said strip during said annealing as said strip is continuously being fed.

20. The method recited in claim 1, comprising an additional step of preheating said strip prior to rapidly bringing the strip to an annealing temperature.

21. The method recited in claim 1, wherein said strip is preheated to substantially 150°–375° C.

22. The method recited in claim 1, comprising an additional step of magnetically annealing said strip as said strip cools through a curie temperature characteristic of said strip while said strip is continuously fed.

23. The method recited in claim 1, wherein said feed rate of movement is between substantially 0.1 to 100 ft/min.

24. The method recited in claim 1, comprising additional steps of feeding multiple ribbons in alignment and bonding said multiple ribbons into a composite strip for subsequent continuous in-line annealing.

25. The method recited in claim 1 wherein said step of rapidly bringing said strip to an annealing temperature includes the steps of heating said strip to a temperature substantially 95% of its crystallization temperature and subjecting said strip to a pressure of at least 25,000 psi.

26. The method recited in claim 1 wherein said annealing step includes the step of maintaining said strip at between 420°–510° C. for a period of time of substantially 0.01–10.0 minutes.

27. The method recited in claim 1, wherein said tension placed on said strip is obtained by applying a torque of substantially 200–600 inch lbs.

28. The method recited in claim 1, comprising an additional step of regulating the temperature of a hot plate within a range of substantially ±5° C. during annealing of said strip so as to assure consistent magnetic properties throughout said strip.

* * * * *